United States Patent
Lyu et al.

(10) Patent No.: US 7,582,837 B2
(45) Date of Patent: Sep. 1, 2009

(54) WITHDRAW-IN AND WITHDRAW-OUT APPARATUS FOR AIR CIRCUIT BREAKER

(75) Inventors: Gae Goo Lyu, Cheongju-si (KR); Kl Cheol Na, Cheongju-si (KR); Myoung Soo Kim, Cheongju-si (KR); Hyun Jae Kim, Cheongju-si (KR); Jae Kwan Seo, Cheongju-si (KR)

(73) Assignee: LS Industrial Systems Co., Ltd, Seoul (KR)

( * ) Notice: Subject to any disclaimer, the term of this patent is extended or adjusted under 35 U.S.C. 154(b) by 139 days.

(21) Appl. No.: 11/873,049

(22) Filed: Oct. 16, 2007

(65) Prior Publication Data
US 2008/0174940 A1    Jul. 24, 2008

(30) Foreign Application Priority Data
Oct. 17, 2006   (KR)   ............. 10-2006-0101059
Aug. 21, 2007   (KR)   ............. 10-2007-0084062

(51) Int. Cl.
*H01H 9/20* (2006.01)
(52) U.S. Cl. .................. 200/50.21; 200/50.26
(58) Field of Classification Search ... 200/50.21–50.26; 361/605–609
See application file for complete search history.

(56) References Cited

U.S. PATENT DOCUMENTS

| | | | | |
|---|---|---|---|---|
| 6,160,228 A | * | 12/2000 | Gerbert-Gaillard et al. | 200/50.21 |
| 6,229,106 B1 | * | 5/2001 | Robbins et al. | 200/50.21 |
| 6,490,149 B2 | * | 12/2002 | Shichida et al. | 361/605 |
| 6,884,949 B2 | * | 4/2005 | Yoon | 200/50.26 |
| 6,998,550 B1 | * | 2/2006 | Jur et al. | 200/50.21 |
| 7,067,746 B2 | * | 6/2006 | Deylitz | 200/50.01 |

* cited by examiner

*Primary Examiner*—Michael A Friedhofer
(74) *Attorney, Agent, or Firm*—Lee, Hong, Degerman, Kang & Waimey

(57) ABSTRACT

An air circuit breaker is provided wherein a rotational force is accurately discontinued at a movement completion time of assuming a connected position, a test position or a disconnected position by a breaker body in the process of withdrawing in and withdrawing out the breaker body from a cradle whereas a driving connection is performed if necessary, the breaker including a coupling device capable of being moved to a position where a withdraw-in and withdraw-out driving force generated by a manipulating handle is transmitted to a withdraw in and withdraw out apparatus and to a position where the withdraw-in and withdraw-out driving force is stopped of transmission.

11 Claims, 13 Drawing Sheets

[FIG. 12]

WITHDRAW-IN AND WITHDRAW-OUT APPARATUS FOR AIR CIRCUIT BREAKER

CROSS-REFERENCE TO RELATED APPLICATION

The present application is based on, and claims priorities from, Korean Application Numbers 10-2006-0101059 filed Oct. 17, 2006 and 10-2007-0084062 filed Aug. 21, 2007, disclosures of which are incorporated by reference herein in its entirety.

BACKGROUND OF THE INVENTION

1. Field of the Invention

The following description relates generally to an air circuit breaker, and more particularly to a withdraw-in and withdraw-out apparatus (herein after referred to as apparatus) for an air circuit breaker capable of preventing breakage of the apparatus that restrains withdraw-in and withdraw-out of a breaker body when an excessive force is applied by a user in the process of the breaker body being withdrawn in and withdrawn out from a cradle, and accurately checking the withdrawn-in and withdrawn-out states of the breaker body to thereby enhance convenience in the use of the product.

2. Background Art

Generally, an air circuit breaker is divided into a fixed type fixedly installed between a power source and a load, and a drawer type in which a breaker is movable so as to be separated from the power source and a load in order to facilitate maintenance and secure stability, according to accommodation and fixing method of a breaker body. The drawer type air circuit breaker is typically divided into a cradle, and a breaker body movable so as to be pushed in or pulled out from the cradle.

The fixed type air circuit breaker is so configured as to have an intrinsic terminal to be connected to an electrical power at a rear surface thereof, while the cradle-mounted drawer type air circuit breaker is disposed with a power source connection terminal connected to power source and a load connection terminal connected to electrical load equipment.

In other words, the drawer type air circuit breaker is such that the breaker body is translocated by a separate translocation apparatus disposed underneath the cradle to be connected to a terminal inside the cradle, and connected to a power source connection terminal connected to power source and a load connection terminal connected to electrical load equipment, where the draw type air circuit breaker may assume one of the three different situations:

1. "Connected (Service) Position" where power as well as control circuit is connected so that the breaker body is completely connected to a terminal inside the cradle.
2. "Test Position" where power circuit is disconnected but control circuit is connected. In this position, the circuit breaker can be tested for proper functioning without switching and/or carrying power.
3. "Disconnected (Isolated) Position" where the breaker body is also disconnected from the power source and external power system circuit.

The withdraw in and withdraw out apparatus (hereinafter referred to as apparatus) disposed underneath the cradle for translocating the breaker body includes a moving rack for linearly translocating the breaker body disposed thereon, and a screw shaft spirally connected to the cam to convert a rotating force from a handle to a linear force. The apparatus may further include a lever and a screw rotatably connected via a coupling, and the coupling may rotatably include an indicator at one side thereof.

The lever is disposed at one side thereof with a hexagonal groove for rotating with the handle. The breaker is withdrawn in and out from the cradle in such a manner that the screw is rotated along with the rotation of the lever by the handle to linearly move a supporter fixedly mounted at the breaker body from a fixed block fixed at the cradle side.

There are shortcomings in the conventional air circuit breaker thus described in that a user cannot recognize a withdraw-in operation even if a breaker body is put into a connected position to thereby complete the withdraw-in operation of the breaker body, and if a lever is forcibly rotated, the apparatus may be destroyed to push the breaker body further into the cradle, which in turn may destroy other remaining constituent elements of the air circuit breaker.

SUMMARY OF THE INVENTION

Accordingly, the present invention has been made to solve the above-mentioned problems occurring in the prior arts, and it is an object of the present invention to provide a withdraw-in and withdraw-out apparatus (hereinafter referred to as apparatus) for an air circuit breaker capable of preventing breakage of the apparatus when a forcible power is applied by a user in the process of a breaker body being withdrawn in and withdrawn out from a cradle, and accurately checking the withdrawn-in and withdrawn-out status of the breaker body to thereby enhance convenience in the use of the product.

In one general aspect, the apparatus for an air circuit breaker for withdrawing in and withdrawing out a breaker body from a cradle includes a coupling device movable to a position from which a withdraw-in and withdraw-out driving force (hereinafter referred to as driving force) generated by a manipulating handle can be transmitted to the apparatus and a position from which the driving force can be discontinued from being transmitted to the apparatus.

The coupling device may include a coupling capable of being moved to a position where the driving force is connected to the apparatus and to a position where the connection is discontinued to idle the apparatus, and a spring for resiliently supporting the coupling in such a manner that the spring resiliently supports at an elastic energy-accumulated position the coupling for transmitting the driving force to the apparatus, and the spring resiliently supports at an elastic energy-released position the coupling for discontinuing the driving force to the apparatus.

Meanwhile, a withdraw in and withdraw out apparatus for an air circuit breaker for withdrawing in and withdrawing out a breaker body from a cradle thereof includes a withdraw-in and withdraw-out shaft formed with a handle connector connecting a manipulating handle for obtaining a rotation driving force and providing the rotation driving force transmitted from the handle connector as a driving force for withdrawing in and withdrawing out the body thereof, a spiral shaft rotatable by the rotation driving force from the withdraw-in and withdraw-out shaft and formed with a spiral part for converting the rotation driving force to a linear moving force, a moving rack formed with a spiral support spirally connected to the spiral part of the spiral shaft and for linearly moving along with the spiral part of the spiral shaft to linearly move the body loaded thereon to withdraw-out and withdraw-in directions, a coupling interposed between the withdraw-in and withdraw-out shaft and the spiral shaft and capable of being moved to a position where the rotation driving force from the withdraw-in and withdraw-out shaft is connected to the spiral shaft and to a position where the connection is discontinued to idle the withdraw-in and withdraw-out shaft, a spring for resiliently supporting the coupling in such a manner that the spring resiliently supports at an elastic energy-accumulated position the coupling for transmitting the rotation driving force from the withdraw-in and withdraw-out shaft to the spiral shaft, and the spring resiliently supports at an elastic energy-released position the coupling for discontinuing the rotation driving force to the spiral shaft, a reset operator including a reset push tip end receiving a push from a user when pressed by the user in such a manner that the spring is pressed to a position where the elastic energy is accumulated to allow the coupling to stay on a position where the rotation driving force from the withdraw-in and withdraw-out shaft is transmitted to the spiral shaft, and a spring support connecting an end of the spring, an indicating rod formed with a latch restraining the reset operator or releasing the restraint of the reset operator whenever the body is located at a connected position, a test position and a disconnected position, and a twist part connected to the moving rack to thereby indicate a position of the body by rotating in response to the movement of the moving rack, and a lock plate temporarily stopping the withdraw-in and withdraw-out operation of the body by temporarily breaking the coupling whenever the indicating rod releases the reset operator from the connected, test and disconnected positions.

Implementations of this aspect may include one or more of the following features.

The coupling includes an angular inner peripheral surface drivingly connecting the withdraw-in and withdraw-out shaft to a driving connecting tip of the spiral shaft, and an inner circular peripheral surface capable of idling the withdraw-in and withdraw-out shaft by stopping discontinuing the driving connection between the withdraw-in and withdraw-out shaft to a driving connecting tip of the spiral shaft.

The withdraw-in and withdraw-out shaft and the driving connecting tip of the spiral shaft are formed in angular shapes to mesh with the inner angular peripheral surface of the coupling and rotate therewith.

The coupling includes a key groove part capable of drivingly connecting the withdraw-in and withdraw-out shaft to the driving connecting tip end of the spiral shaft, and an inner circular peripheral surface capable of idling the withdraw-in and withdraw-out shaft by stopping the driving connection between the withdraw-in and withdraw-out shaft and the driving connecting tip of the spiral shaft.

The withdraw-in and withdraw-out shaft and the driving connecting tip of the spiral shaft are formed with a resiliently supported key part capable of being rotated by being meshed with the key groove part of the coupling.

The apparatus may further include a support member rotatably supporting the spiral shaft and the indicating rod and linearly supporting the reset operator.

The coupling includes an outer angular peripheral surface and an outer circular peripheral surface, and an inner angular peripheral surface restraining the outer angular peripheral surface thereof to correspond with the lock plate so that the coupling can be temporarily stopped in rotation.

The indicating rod may assume three different situations divided into a disconnected position where the body is disconnected from the cradle, a test position where the body can assume an electrical test with the cradle, and a connected position where the body is connected to the cradle.

The coupling is protrudingly formed at one side thereof with a latch groove, and the indicating rod is circumferentially formed with a restraining rail of a predetermined length into which the latch groove can selectively be inserted and coupled.

The apparatus therefore can provide an air circuit breaker capable of accurately discontinue the rotating force at movement completion points of connected, test and disconnected positions in the process of withdrawing in and withdrawing out the breaker body and capable of performing a driving connection if necessary.

As a result, the apparatus restraining the withdrawing-in and withdrawing-out of the body can be protected from being damaged by the coupling if a user applies a excessive force, and at the same time the apparatus can accurately check the withdrawn-in and withdrawn-out states of the breaker body to thereby enhance convenience in the use of the product.

BRIEF DESCRIPTION OF THE DRAWING

FIGS. 6 to 11 illustrate an operating state of the apparatus, where the indicating rod is partially shown for the convenience sake, wherein, FIG. 6 illustrates an operating state where a coupling is initially retracted to a non-connected position between a spiral shaft and a withdraw-in and withdraw-out shaft and a state where the withdraw-in and withdraw-out shaft idles to prevent a rotating force from being transmitted to the spiral shaft even if a handle is rotated, FIG. 7 illustrates an operating state where the coupling unstably connects the spiral shaft and the withdraw-in and withdraw-out shaft while a user presses a front push part of a reset operator, FIG. 8 illustrates an operating state where a breaker body can be withdrawn in or withdrawn out by clockwise or counterclockwise rotating manipulation of a handle while a user further presses a front push part of a reset operator to allow the spiral shaft and the withdraw-in and withdraw-out shaft to be completely connected by a coupling, FIG. 9 illustrates an operating state where a reset operator is retracted to an initial retracted position in response to a latch part of an indicating rod working in cooperation with the break body releasing the reset operator when the body assumes any one position of the connected, test or disconnected position, FIG. 10 illustrates an operating state where a user is shown the body that has assumed any one position out of the connected, test and disconnected position when the reset operator is further retracted to a secondary position from the state of FIG. 9 to allow a lock plate to break the coupling, temporarily stopping the spiral shaft and the withdraw-in and withdraw-out shaft, and FIG. 11 illustrates an operating state where the coupling is retracted by the resilience of an upper spring that elongates when a user ceases rotating the handle at the state of FIG. 10 and returns to the initial state of FIG. 6.

DETAILED DESCRIPTION

Figure 1:
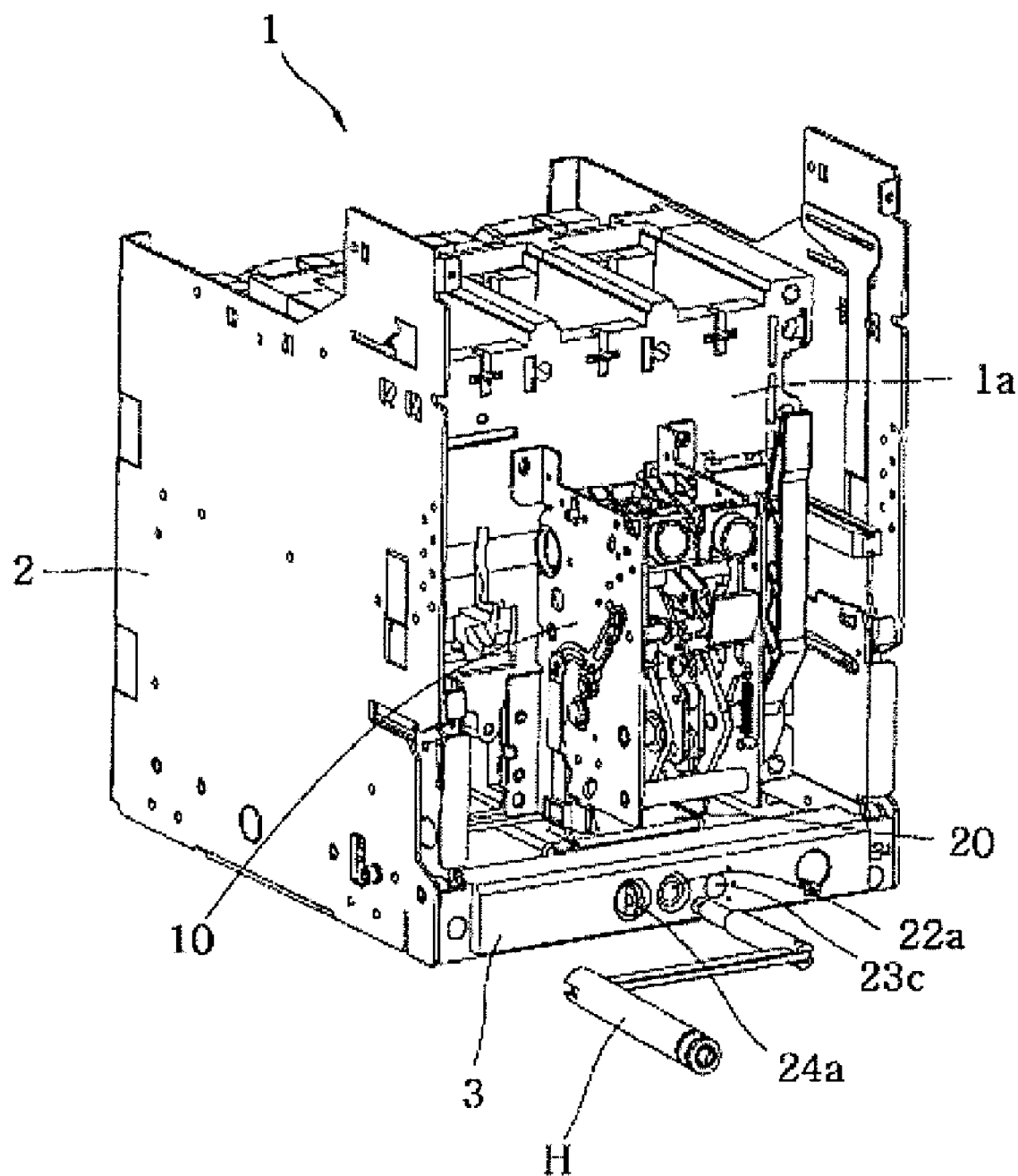
FIG. 1 is a perspective view illustrating an inner construction of an air circuit breaker including an external approach part of a withdraw-in and withdraw-out apparatus (hereinafter referred to as apparatus) for an air circuit breaker and the apparatus.

The above discussed construction, operating effect, other features and additional advantages for accomplishing the object of the present novel concept will be clearly appreciated and understood by those skilled in the art from the detailed description, exemplary implementations and attached drawings.

First, description will be made with regard to an inner construction of an air circuit breaker including an external approach part of a withdraw-in and withdraw-out apparatus (hereinafter referred to as apparatus) for an air circuit breaker and the apparatus with reference to FIG. 1.

An air circuit breaker (1) includes a breaker body (1a) essentially consisting of a movable contact and a fixed contact and an isolation barrier electrically isolating the movable contact and the fixed contact, a cradle (2) accommodating the breaker body (1a) and formed thereafter with a terminal connected to a power source and an electrical load equipment, an open/close mechanism (10) providing a driving force for simultaneously opening and closing the movable contacts inside the breaker body (1a), and a girder (3) so disposed as to trespass a front bottom part of the cradle (2) to provide a user with approach means for manipulating the apparatus.

Unexplained reference character H in FIG. 1 is a handle so connected as to provide the apparatus with a manual rotating force for withdraw in and withdraw out the breaker body (1a).

The girder (3) is externally formed with an approach hole (no reference numeral provided) so exposed as to allow a user to push a reset push tip end (24a) from the left side in FIG. 1, an approach hole (22a) so exposed as to allow the handle (H) to be connected a handle connector (22a), and an exposure hole for allowing a position indicator (23c) to be exposed.

The position indicator (23c) is disposed with an arrow at a tip end surface correspondingly rotating relative to three positions of the breaker body (1a), i.e., the connected position, the test position and the disconnected position, and markings for the connected, test and disconnected positions are indicated at predetermined positions about the exposure hole for the position indicator (23c).

A moving rack (20) is linearly disposed at a rear of the open/close mechanism (10) and underneath the breaker body (1a) such that the cam (20) can load the breaker body (1a) and transfer the breaker body (1a) to a withdraw-in position or a withdraw-out position by being connected to a driving part of the apparatus.

Now, construction of the apparatus will be described with reference to FIGS. 2 to 5.

Figure 2:
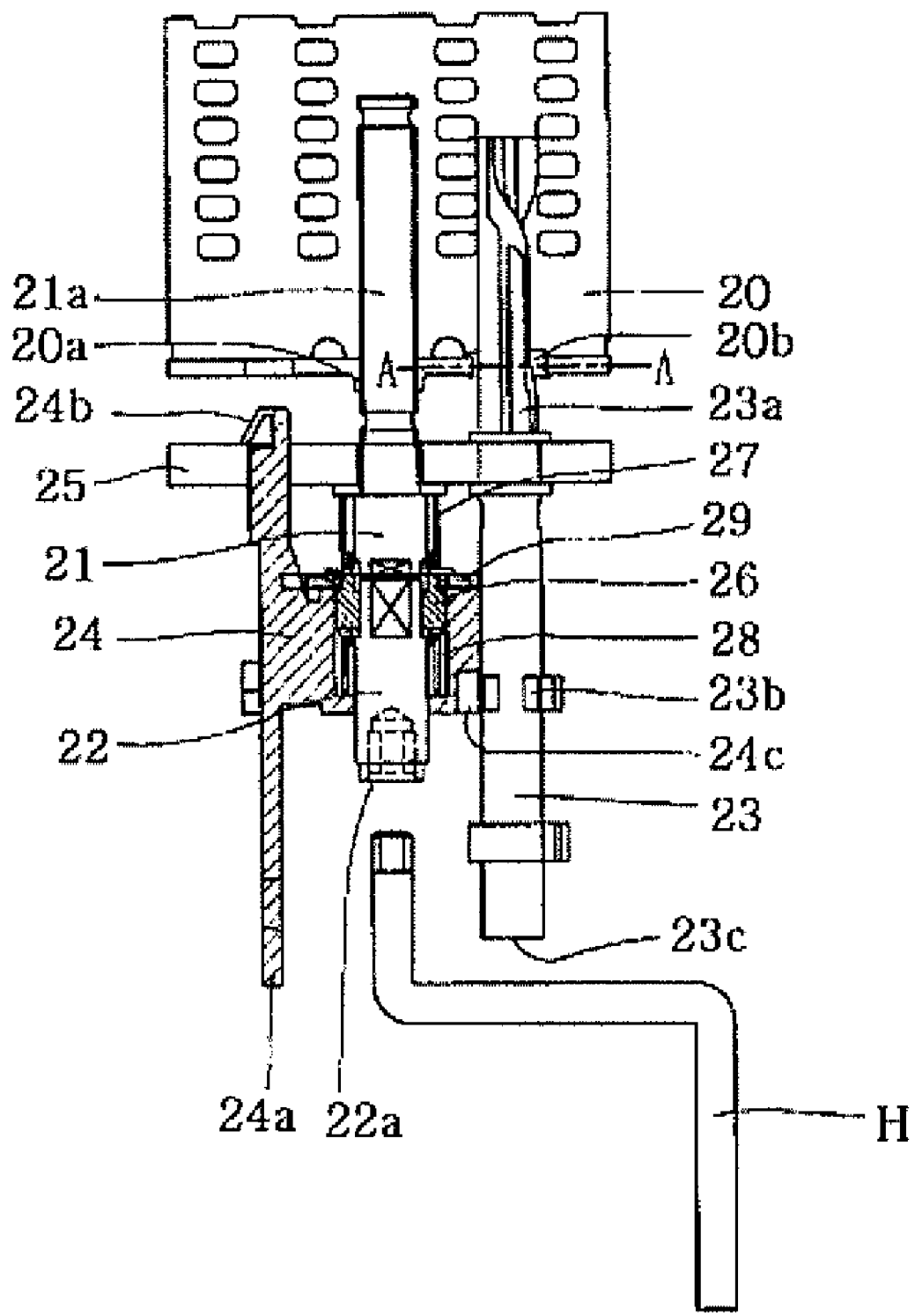
FIG. 2 is a plan view illustrating an overall construction of a withdraw-in and withdraw-out apparatus (hereinafter referred to as apparatus) for an air circuit breaker.

Referring to FIG. 2, the apparatus includes coupling devices (26, 27, 28) movable to a position where the withdraw-in and withdraw-out driving force generated by the manipulating handle (H) is transmitted to the apparatus, and a position where the withdraw-in and withdraw-out driving force generated by the manipulating handle (H) is discontinued in transmission.

The coupling devices (26, 27, 28) include a coupling (26) capable of moving to a position where the withdraw-in and withdraw-out driving force is drivingly connected to the apparatus or a position where the driving connection is discontinued to idle the apparatus, and springs (27, 28) for resiliently supporting the coupling (26) in such a manner that the spring resiliently supports at an elastic energy-accumulated position the coupling (26) for transmitting the driving force to the apparatus, and the spring resiliently supports at an elastic energy-released position the coupling (26) for discontinuing the driving force to the apparatus.

The springs (27, 28) may be divided into an upper spring (27) for providing the coupling (26) with a pushing elasticity in an upper-to-lower direction, and a lower spring (28) for providing the coupling (26) with a pushing elasticity in a lower-to-upper direction.

To be more specific, and referring to FIG. 2, the apparatus includes a withdraw-in and withdraw-out shaft (22), a spiral shaft (21), a moving rack (20), a coupling (26), springs (27, 28), a reset operator (24), an indicating rod (23) and a lock plate (29).

The apparatus further includes a support member for rotatably supporting the spiral shaft (21) and the indicating rod (23) and simultaneously for linearly moving the reset operator (24).

Figure 4:
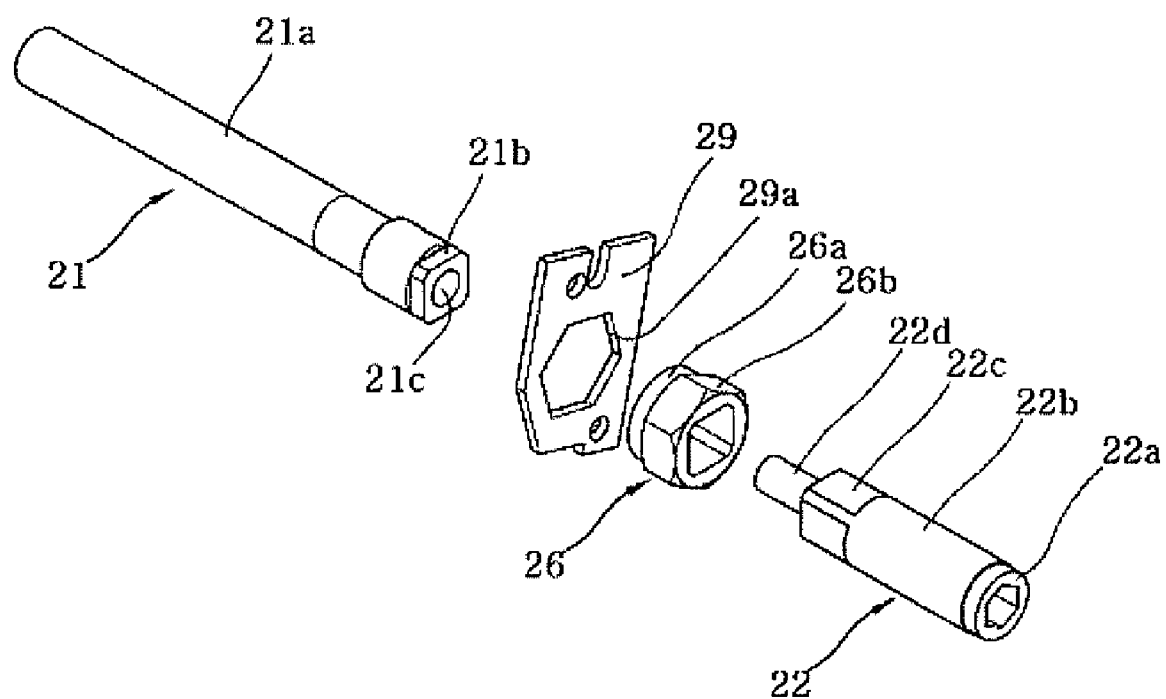
FIG. 4 is an exploded perspective view of a driving part out of the apparatus.

Referring to FIGS. 2 and 4, the withdraw-in and withdraw-out shaft (22) is disposed with a handle connector (22a) for connecting the manipulating handle (H) for securing the rotation force, where the rotation driving force transmitted by the handle connector (22a) may be a driving force for withdrawing in and withdrawing out the breaker body (1a of FIG. 1).

Now, referring to FIG. 4, the handle connector (22a) is disposed with a hexagonal inner surface adequate for transmitting the rotation driving force by being meshed with a connection tip end of the hexagonal handle (H), and the withdraw-in and withdraw-out shaft (22) includes a cylindrical body part (22b) in succession of the handle connector (22a), a rectangular part (22c) of rectangular periphery formed in succession of the cylindrical body part (22b) that functions as a driving connector rotatable by being inserted into the inner angular peripheral surface part (26b-1 of FIG. 5), and a connection protruder (22d) formed in succession of the rectangular part (22c) for being insertedly connected to a connection opening (21c) of the spiral shaft (21).

The spiral shaft (21) is formed with a spiral part (21a) which is rotatable by the rotation driving force from the withdraw-in and with draw-out shaft (22), and which is configured for transmitting the rotation driving force to a linear moving force.

Figure 5:
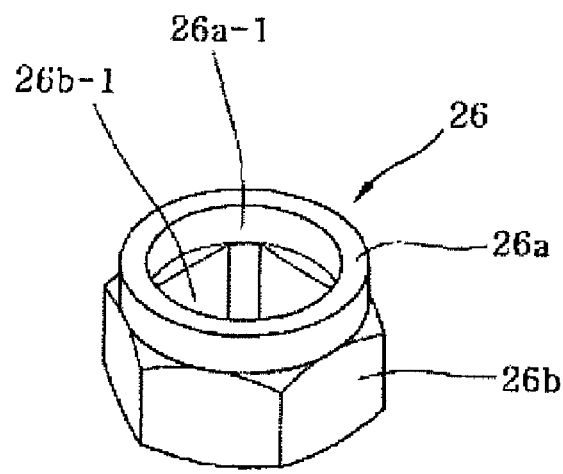
FIG. 5 is a perspective view of a coupling out of the apparatus according to an exemplary implementation of the present disclosure.

Referring back to FIG. 4, the spiral shaft (21) is formed at a tip end opposite the withdraw-in and withdraw-out shaft (22) with a rectangular part (21b) insertedly connected to the inner angular peripheral surface (26b-1) of the coupling in FIG. 5, which is a driving connection tip end rotatable by being drivingly connected to the withdraw-in and withdraw-out shaft (22) by the coupling (22). The spiral shaft (21) is also disposed at an inner axial direction of the rectangular part (21b) with a connection opening (21c) into which the connection protruder (22d) of the withdraw-in and withdraw-out shaft (22) can be insertedly connected.

The moving rack (20) is formed with a spiral support (20a) spirally connected with the spiral part (21a) of the spiral shaft (21) and can linearly move along the spiral part (21a) of the spiral shaft (21) to linearly move the breaker body (1a) to a withdraw-on and withdraw-out direction.

The moving rack (20) of FIG. 2 includes a flat plate part (no reference numeral given) that loads the breaker body (1a) and an axial support plate part (no reference numeral designated) provided at a front side of the flat plate part, i.e., provided at a right angle from the flat plate part and from a lower tip end of FIG. 2.

Furthermore, the axial support plate part of the moving rack (20) includes a spiral support part (20a) for linearly moving the moving rack (20) to the withdraw-in direction, i.e., to an upward direction on FIG. 2, or to the withdraw-out direction, i.e., a downward direction on FIG. 2, by being spirally connected to the spiral part (21a) of the spiral shaft (21), and a twist support part (23b) for rotating the indicating rod (23) as much as an angle corresponding to a movement position when the moving rack (20) loaded with the breaker body (1a) is moved to the withdraw-in and withdraw-out direction by supportive rotation of the twist part (23a) of the indicating rod (23).

The coupling (26) is interposed between the withdraw-in and with draw-out shaft (22) and the spiral shaft (21) and may be moved to a position where the rotation driving force from the withdraw-in and with draw-out shaft (22) is drivingly connected to the spiral shaft (21) or to a position where the driving connection is discontinued to idle the withdraw-in and with draw-out shaft (22).

To be more specific by referring to an exemplary implementation of FIG. 5, the coupling (26) includes the inner angular peripheral surface part (26b-1) drivingly connecting the withdraw-in and with draw-out shaft (22) to the driving connection tip end of the spiral shaft (21), and a circular inner peripheral part (26a-1) capable of idling the withdraw-in and with draw-out shaft (22) by interrupting the driving connection of the driving connection tip end of the spiral shaft (21).

Referring back to FIGS. 4 and 5, the coupling (26) includes an angular peripheral part (26b) and a circular peripheral part (26a), wherein the angular peripheral surface part (26b) is a part inserted into an angular restraining part (29a) of the lock plate (29) and temporarily interrupted in rotation thereof, and the circular peripheral surface part (26a) is a part freely rotatable irrespective of the angular restraining part (29a) of the lock plate (29).

Figure 14:
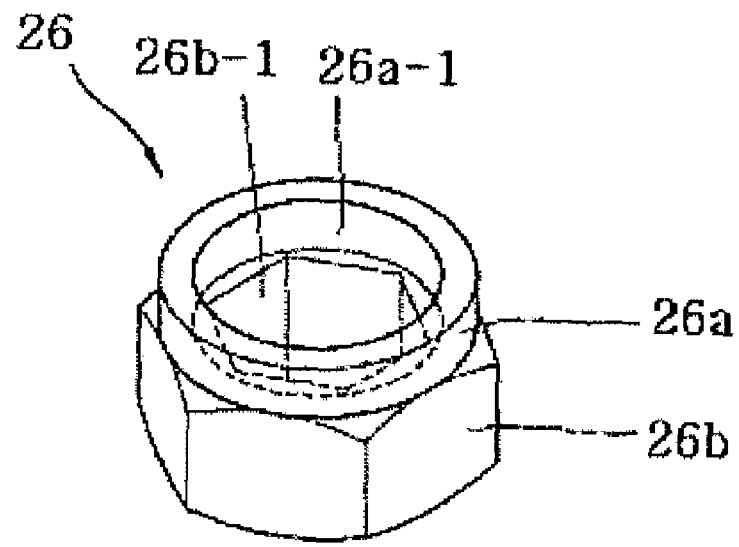
FIG. 14 is a perspective view illustrating a coupling of the apparatus according to a second exemplary implementation.
Figure 15:
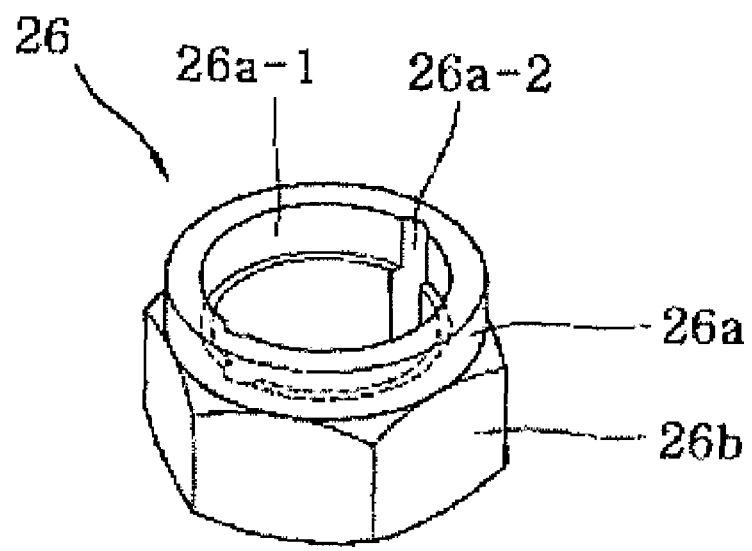
FIG. 15 is a perspective view illustrating a coupling of the apparatus according to a third exemplary implementation.
Figure 16:
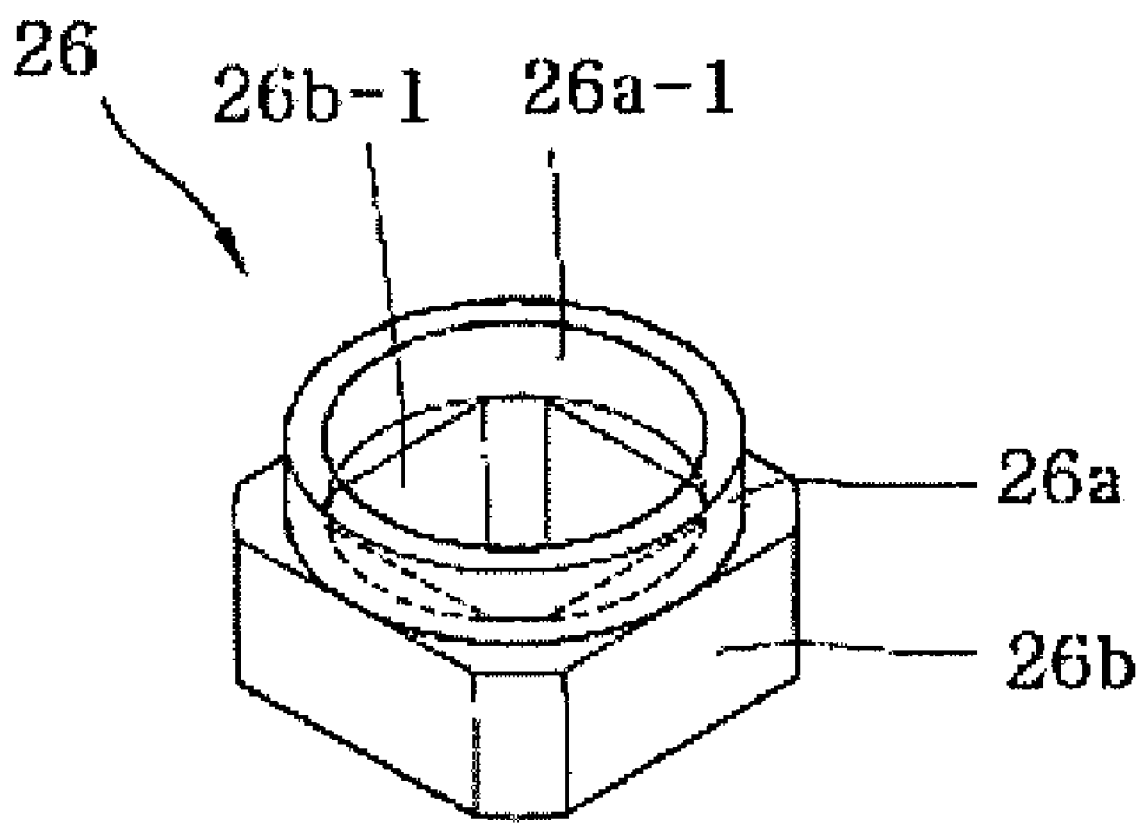
FIG. 16 is a perspective view illustrating a coupling of the apparatus according to a fourth exemplary implementation.

The coupling (26) may be constructed as in other implementations illustrated in FIGS. 14, 15 and 16 in addition to construction of the exemplary implementation of FIG. 5.

The coupling of FIG. 14 is different from that of FIG. 5 in that the inner angular peripheral part (26b-1) is hexagonal whereas the corresponding part of FIG. 5 is rectangular. The withdraw-in and with draw-out shaft (22) and the driving connection tip end of the spiral shaft (21) are hexagonal to match the coupling (26) of FIG. 14.

The coupling (26) of FIG. 15 includes a key groove part (26a-2) for drivingly connecting the withdraw-in and with draw-out shaft (22) to the driving connection tip end of the spiral shaft (21), and a circular inner periphery part (26a-1) capable of idling the withdraw-in and with draw-out shaft (22) by interrupting the driving connection of the driving connection tip end of the spiral shaft (21).

If the coupling (26) is configured as in the other exemplary implementation of FIG. 15, it can be anticipated that the withdraw-in and with draw-out shaft and the driving connection tip end of the spiral shaft must be formed with a resiliently supportive tip end having a key part (no reference numeral provided) so as to rotate with the key groove part (26a-2) of the coupling (26).

The coupling (26) of FIG. 16 is different from that of other implementations in that the angular peripheral part (26b) is rectangular, where the angular restraining part (29a) of the lock plate (29) must be also rectangular to correspond thereto.

Figure 6:
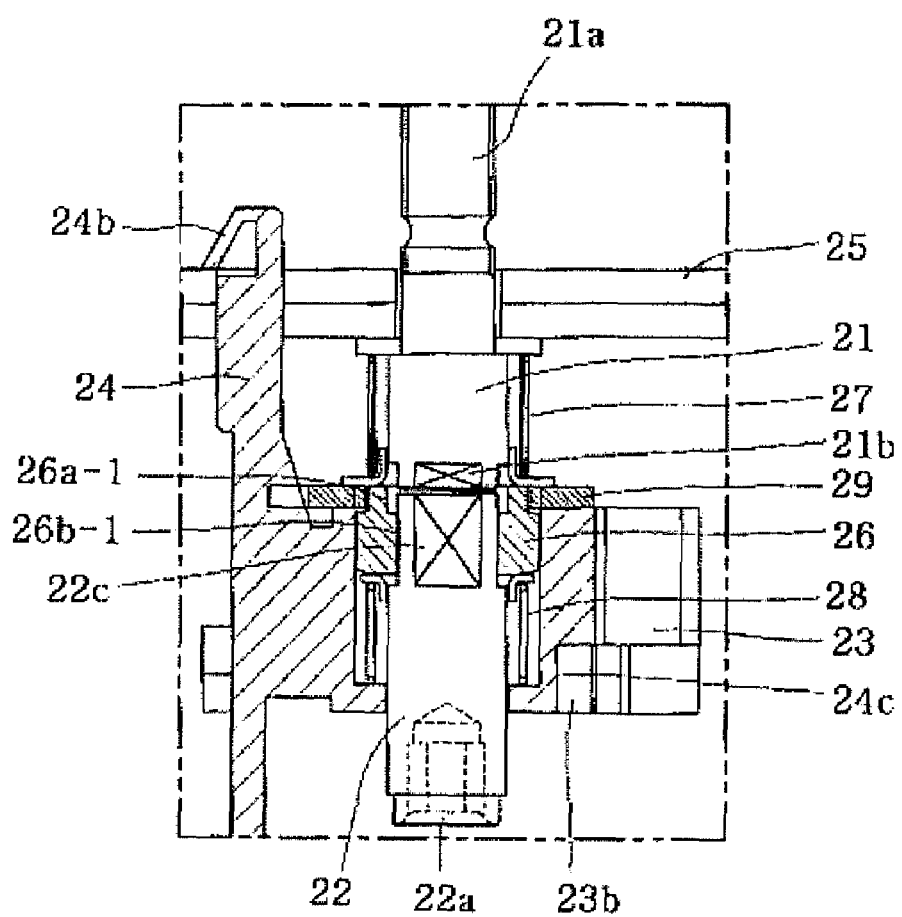
Figure 9:
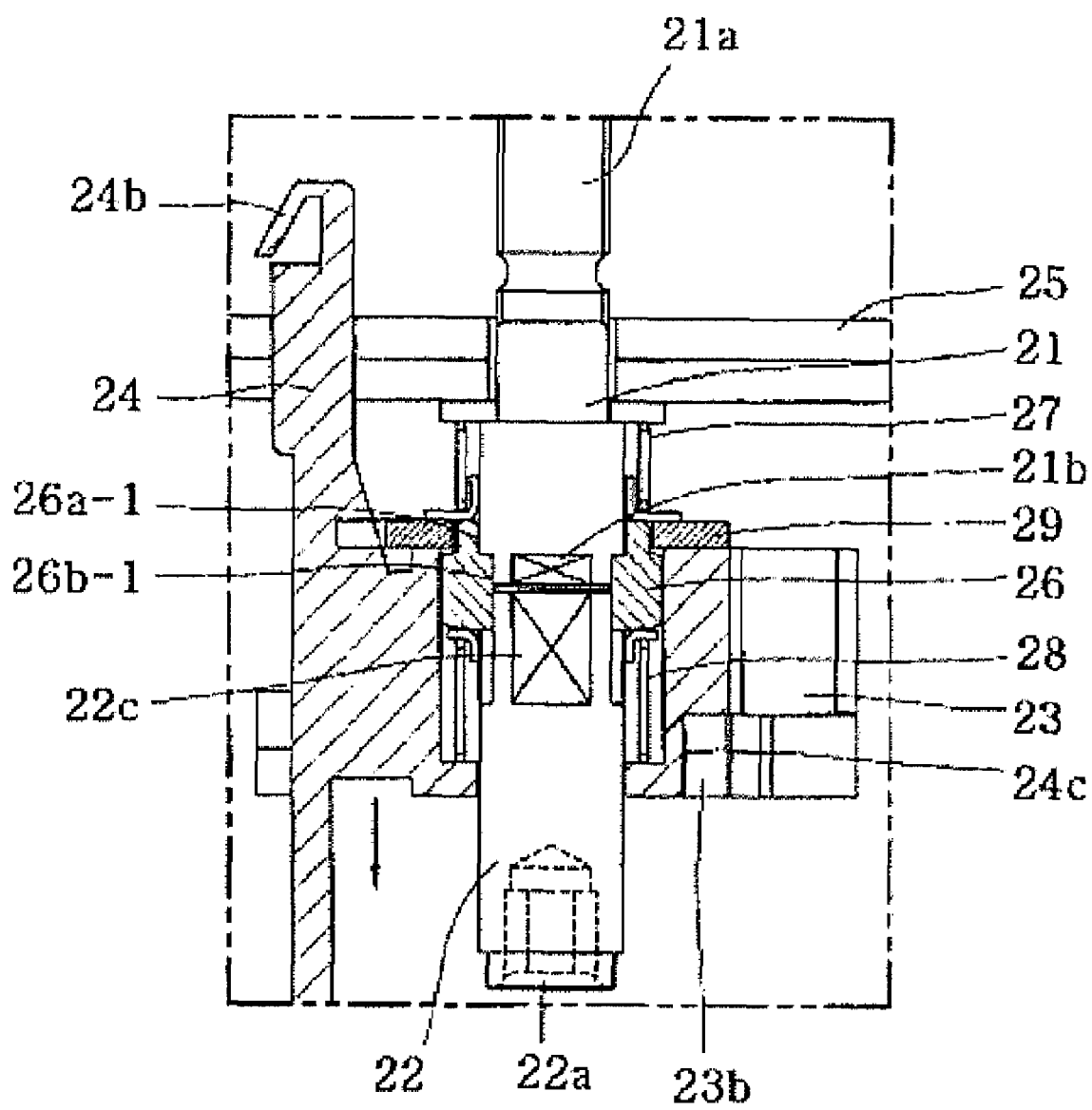
Figure 11:
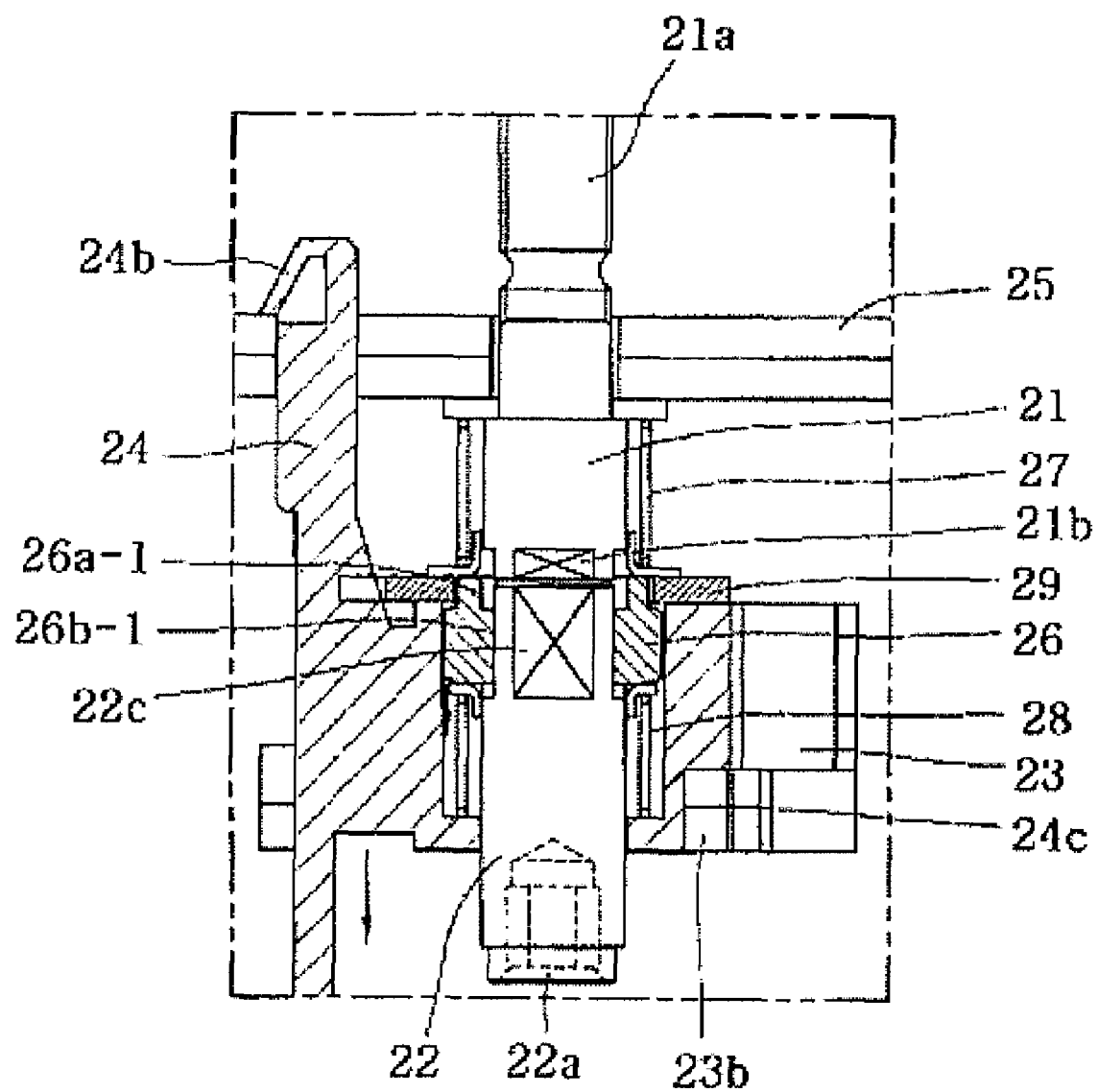

The springs (27, 28) elastically supports the coupling (26) in such a fashion that as illustrated in FIG. 9, the springs resiliently support at an elastic energy-accumulated position the coupling for transmitting the rotation driving force from the withdraw-in and withdraw-out shaft to the spiral shaft, and as illustrated in FIG. 6 or 11, the springs resiliently support at an elastic energy-released position the coupling for discontinuing the rotation driving force to the spiral shaft.

To be more specific, the springs (27, 28) include an upper spring (27) for providing the coupling (26) with a pushing elasticity in an upper-to-lower direction, and a lower spring (28) for providing the coupling (26) with a pushing elasticity in a lower-to-upper direction, as illustrated in FIG. 2.

The spiral shaft (21) is formed at a portion supported by a support member (25) with a flange part for preventing an upward movement of FIG. 2, and the upper spring (27) is supported at an upper end thereof by the flange part and is supported at a lower end thereof by an upper flange type spring seat (no reference numeral given) mounted for a linear movement along a lower peripheral surface of the spiral shaft (21) by a lower portion of the spiral shaft (21) being inserted therethrough. The withdraw-in and with draw-out shaft (22) is circumferentially formed with a linearly movable lower flange type spring seat (no reference numeral provided), and an upper surface of the lower flange type spring seat is so situated as to contact the coupling (26).

The lower spring (28) is supported at an upper end thereof by the lower flange type spring seat and is supported at a lower end thereof by the reset operator (24). To be more specific, the reset operator (24) is inserted into a peripheral surface of the withdraw-in and with draw-out shaft (22) and can linearly move on the peripheral surface of the withdraw-in and with draw-out shaft (22), where the lower end of the lower spring (27) is supported by the spring support of the reset operator which is an inserted portion of the withdraw-in and with draw-out shaft (22).

The reset operator (24) includes a reset push tip end (24a) to be pushed by a user so as for the coupling (26) to transmit the rotation driving force from the withdraw-in and with draw-out shaft (22) to the spiral shaft (21) by applying pressure by the springs to the springs (27, 28) in the elastic energy-accumulation manner when the reset push tip end is pressed by the user, and a spring support (see FIG. 2 for a portion contacting a lower end of the lower spring) contacting a tip end of the lower spring (27).

The reset operator (24) which is extended through the support member (25) includes a front tip end (24b) for restraining a downward movement of the reset operator (24) of FIG. 2, a reset push tip end (24a) and a latch groove part (24c) where a latch part (23b) of the indicating rod (23) is restrained or released by being inserted or detached.

Figure 12:
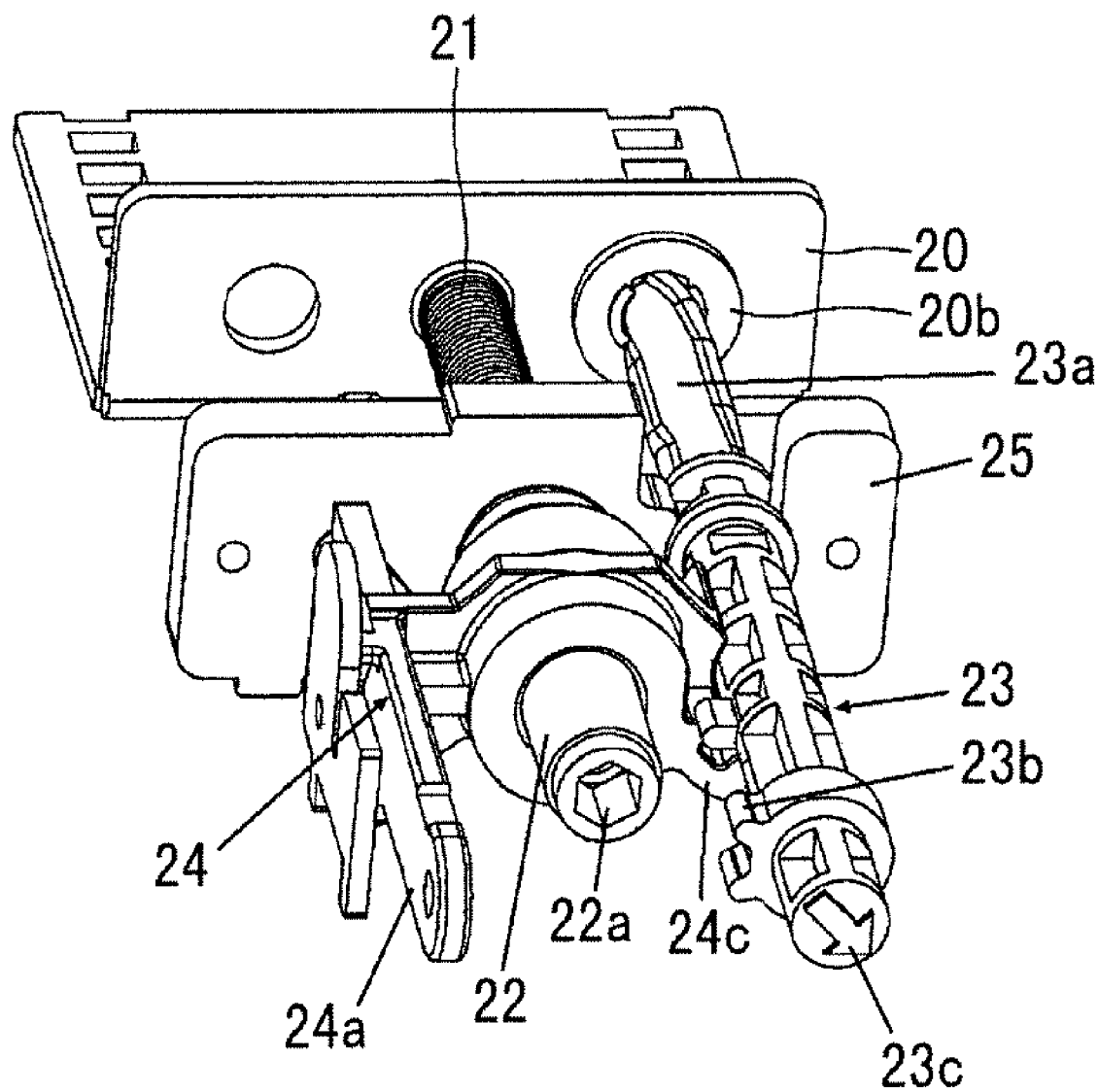
FIG. 12 is a perspective view illustrating an apparatus according to an exemplary implementation of FIG. 2.

Referring to FIG. 12, the indicating rod (23) includes a latch (23b) restraining the reset operator (24) or releasing the restraint of the reset operator (24) whenever the breaker body (1a) is located at a connected position, a test position and a disconnected position, and a twist part (23a) connected to the moving rack (20) to thereby indicate a position of the body by rotating in response to the linear movement of the moving rack (20).

A twist groove formed at the twist part (23a) of the indicating rod (23) is given a length of 9.5 mm where an angle relative to a horizontal surface from a position maximally extracted by the moving rack (20) from the support member

(25) fixedly installed at the cradle (not shown) side to a disconnected position is zero degree, and the twist groove is given a length of 9.4 mm where an angle relative to the horizontal surface is 46 degrees when the moving rack (20) is located between the disconnected position and the test position.

Furthermore, an angle formed by the twist groove of the twist part (23a) relative to the horizontal surface is 25 degrees when the moving rack (20) is situated at a first section between the test position and the connected position, and the length of the twist groove is given at 9 mm, and the twist groove is given a length of 19.6 mm where an angle is zero degree relative to the horizontal surface when the moving rack (20) is located at a second section between the test position and the connected position. An angle of the twist groove is 23 degrees relative to the horizontal surface and a length thereof is 9 mm when the moving rack (20) is located at a third section between the test position and the connected position.

The lock plate (29) is brought into contact with a peripheral surface of the coupling (26) to be situated at a position capable of breaking the coupling (26), and temporarily breaks the coupling (26) whenever the indicating rod (23) releases the reset operator (24) at the three positions to temporarily interrupt the withdraw-in and withdraw-out operation of the breaker body.

To be more specific, the lock plate (29) which is of a flat member includes an inner angular surface part (29a) for interrupting the rotation of the coupling (26) by being inserted into the outer angular part (26b) of the coupling (26).

The lock plate (29) is moved downward in FIG. 2 by elasticity caused by the elastic energy released by the upper spring (27), i.e., by the elongation of the upper spring (27) to allow the inner angular surface part (29a) to be inserted into the outer angular part (26b) of the coupling (26) and to temporarily stop the rotation of the coupling (26) as illustrated in FIG. 12 whenever the latch part (23b) of the indicating rod (23) releases the reset operator (24) at the connected, test and disconnected positions assumed by the breaker body (1a).

Figure 3:
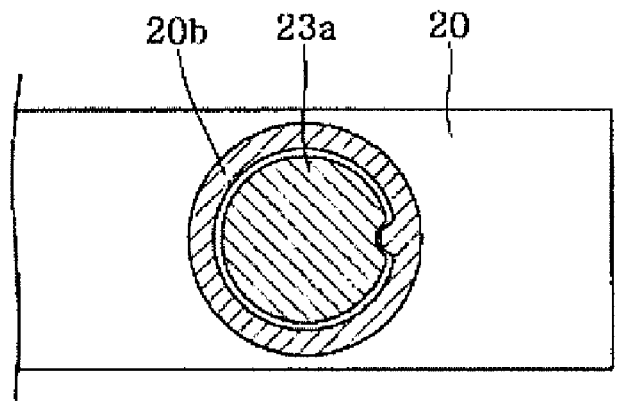
FIG. 3 is a cross-sectional view taken along line A-A of FIG. 2 illustrating an indicating rod and a connected part of a moving rack.

A twist support part (20b) is mounted at a front surface of the linearly-movable moving rack (20) as shown in FIG. 2, where the twist support part (20b) is a support member assuming an approximate ring shape as depicted in FIG. 3, is formed at an inner surface thereof with a support protruder for supporting the twist groove formed at the twist part (23a) of the indicating rod (23).

Although one support member is shown in the exemplary implementation of FIG. 12, the number of support members may be 2 to 4 and vary in accordance with that of the twist grooves of the twist part (23a) at the indicating rod (23). The indicating rod (23) is provided with the twist part (23a), and likewise, the number of the twist grooves at the twist part (23a) may be variably provided like more than 1, i.e., 2 to 4. The moving rack (20) moves linearly whereas the twist part (23a) of the indicating rod (23) rotatably supported by the support member (25) cannot move linearly. In other words, as illustrated in FIG. 12, the indicating rod (23) can perform the rotation only and cannot perform a linear movement because of flange part of the support member (25) (the flange part being an intermediate portion of the indicating rod which is a marginal protruding portion of a portion supported by the support member). Accordingly, when the moving rack (20) linearly moves in the withdraw-in or withdraw-out direction, the support protruder moves along the twist groove formed at the twist part (23a) of the indicating rod (23) to rotate the indicating rod (23).

Now, the operation of the apparatus will be described with reference to FIGS. 6 to 11 which are operational drawings illustrating the operating state of the apparatus.

Referring to FIGS. 6 to 12, the indicating rod (23) is partially illustrated for the convenience sake while FIGS. 6 to 11 are plan views showing the apparatus cut crosswise and seen from the top thereof.

First, referring to FIG. 6, the operating state of the apparatus shows an initial state of the apparatus. In other words, FIG. 6 is a drawing showing an initial state of operation.

The coupling (26) is retracted to a non-connection position where the spiral shaft (21) and the withdraw-in and withdraw-out shaft (22) are not drivingly connected. The springs (27, 28) are in a state of releasing the elastic energy, while the reset operator (24) is in a downwardly retracted state.

Under this circumstance, even if the handle (11) is connected to the handle connector (22a) the withdraw-in and withdraw-out shaft (22) for rotation, the withdraw-in and withdraw-out shaft (22) idles because of non-connection with the spiral shaft (21), only in a state of being in touch with a tip end of the spiral shaft (21), such that the rotational force of the spiral shaft (21) is not conveyed.

The initial state of FIG. 6 is where the apparatus automatically returns to the initial state when the apparatus assumes the three positions, i.e., disconnected position, test position and the connected position.

In order to drive the apparatus for moving the breaker body from the initial state to other positions, i.e., from the disconnected position to the test position, from the test position to the connected position, from the connected position to the test position, or from the test position to the disconnected position, regardless of where the apparatus is currently located (i.e., disconnected position, test position and connected position), a user must first press the reset push tip end (24a) of the reset operator (24) as illustrated in FIGS. 1 and 2.

The reset push tip end (24a) is well illustrated in FIG. 12. A user presses the reset push tip end (24a) of the reset operator (24). The lower spring (28) is compressed by the spring support (refer to a portion contacting a bottom end of the lower spring in FIG. 2) of the reset operator (24) linearly moving upward in FIG. 7 to accumulate the elastic energy. The coupling (28) is compressed by the spring seat supporting a tip end of the lower spring (28) to start moving upward. At this time, the spiral shaft (21) and the withdraw-in and withdraw-out shaft (22) are yet to be stably connected by the coupling (26). Accordingly, even if the handle is rotated, torque of the withdraw-in and withdraw-out shaft (22) is not transmitted to the spiral shaft (21).

Figure 7:
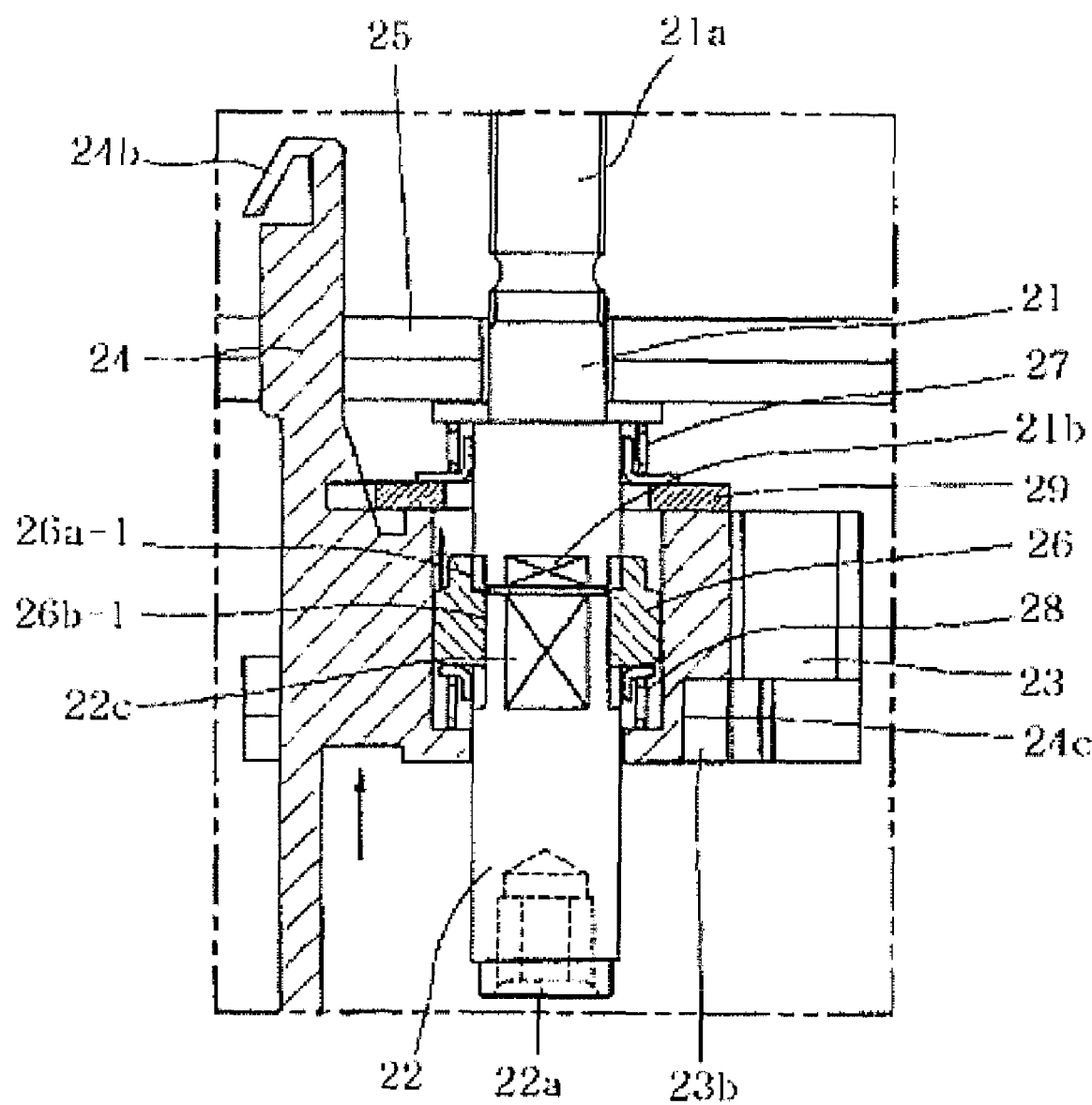
Figure 8:
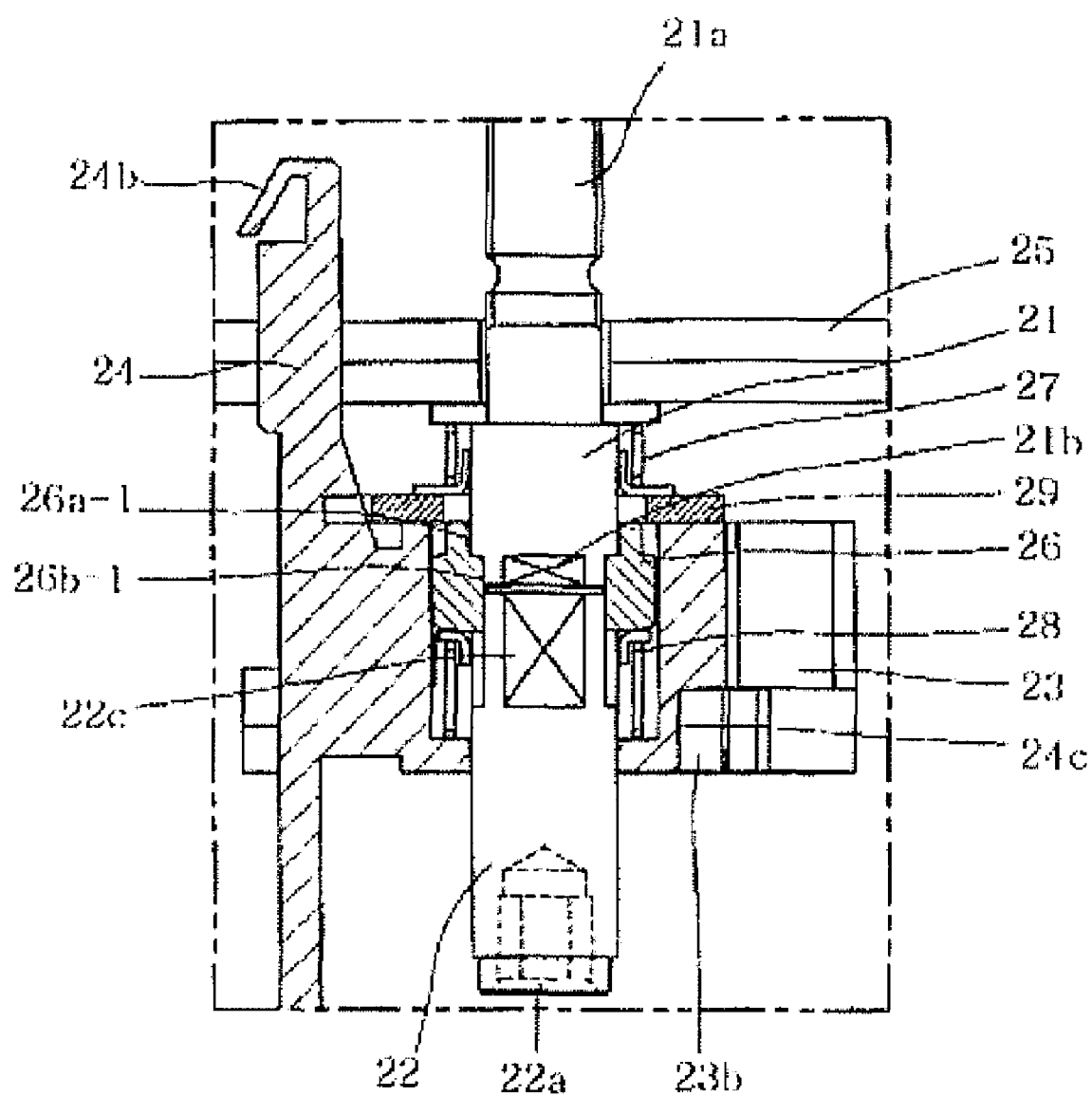

Referring to FIG. 7, when a user further presses the reset push tip end (24a) in an unstable connection state, i.e., at an initial stage, the spiral shaft (21) and the withdraw-in and withdraw-out shaft (22) come to be fully connected by the coupling (26) as depicted in FIG. 8.

In other words, referring to FIG. 8, as the user further presses the reset push tip end (24a) of the reset operator (24), the lower spring (28) is compressed by the spring support (refer to a portion contacting a bottom end of the lower spring in FIG. 2) of the reset operator (24) that moves linearly to an upper direction to accumulate the elastic energy, and the coupling (26) is compressed by the spring seat supporting the tip end of the lower spring (28) to move upwards.

The spiral shaft (21) and the withdraw-in and withdraw-out shaft (22) are completely connected as the inner angular part (26b-1) of the coupling (26) is meshed with the rectangular part (21b) of the spiral shaft (21) and the rectangular part (22) of the withdraw-in and withdraw-out shaft (22), thereby completing the preparedness for driving of the apparatus to the withdraw-in or withdraw-out direction.

Under this circumstance, when the user connects the handle to the handle connector (22a) of the withdraw-in and withdraw-out shaft (22) and rotates clockwise for withdrawing out the breaker body (1a of FIG. 1), the clockwise rotation of the withdraw-in and withdraw-out shaft (22) rotates the spiral shaft (21) drivingly connected by the coupling (26) to the clockwise direction, whereby, as in FIG. 2, the moving rack (20) moves downward along the spiral part (21a) rotating clockwise and the breaker body is moved to the withdraw-out direction by the downward movement of the moving rack (20).

Furthermore, the support protruder of the moving rack (20) is moved by the downward movement of the moving rack (20) along the twist groove of the twist part (23a) at the indicating rod (23) to rotate the indicating rod (23), whereby the latch part (23b) of the indicating rod (23) is inserted into the latch groove part (24c) of the reset operator (24), where the reset operator (24) is restrained of linear movement by the springs (27, 28).

Referring to FIG. 8, when a user connects the handle to the handle connector (22a) of the withdraw-in and withdraw-out shaft (22) to rotate the withdraw-in and withdraw-out shaft (22) counter-clockwise for the breaker body (1a) to withdraw in under a state where the coupling (26) fully connects the spiral shaft (21) to the withdraw-in and withdraw-out shaft (22), the counter-clockwise rotation of the withdraw-in and withdraw-out shaft (22) rotates the spiral shaft (21) drivingly connected by the coupling (26), whereby the moving rack (20) moves upward along the spiral part (21a) that is rotating counter-clockwise as shown in FIG. 2, and the breaker body (1a) is moved by the upward movement of the moving rack (20) to the withdraw-in direction.

Meanwhile, when the breaker body is moved to the withdraw-in or withdraw-out direction to allow the breaker body (1a) to assume one of the three (connected, test and disconnected position) positions, the support protruder of the moving rack (20) is moved along the twist groove part of the twist part (23a) at the indicating rod (23) by the withdraw-in or withdraw-out movement direction of the moving rack (20) to rotate the indicating rod (23), whereby the latch part (23b) of the indicating rod (23) is detached from the latch groove part (24c) of the reset operator (24) to release the reset operator (24).

The reset operator (24) is in turn moved downward by the springs (27, 28) that release the elastic energy to be elongated, as illustrated in FIG. 9 to stay on an initially retracted state, where the angular restraining part (29a) of the lock plate (29) stops short of being meshed with the outer angular part (26b) of the coupling (26).

Figure 10:
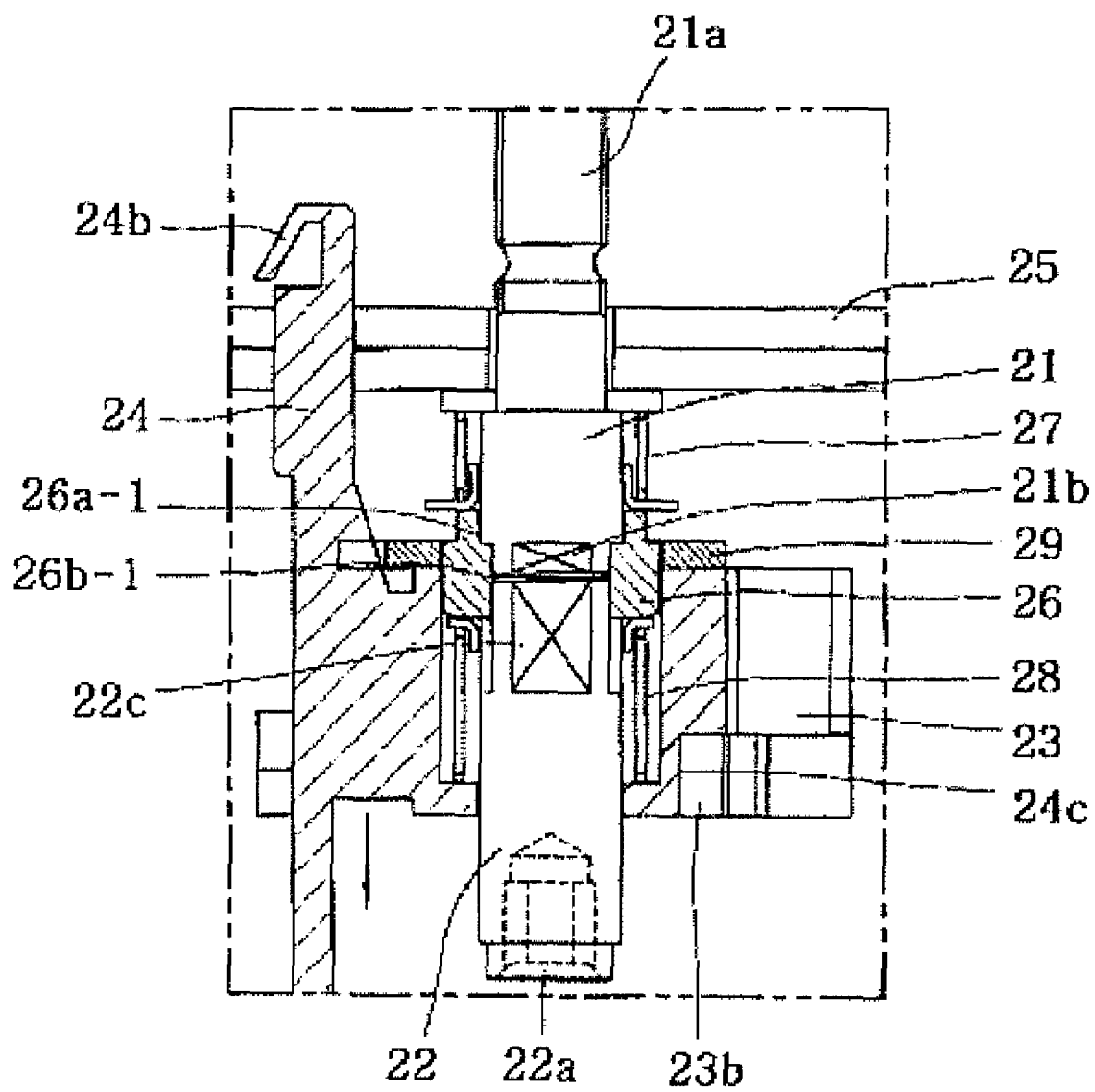

The reset operator (24) is further retracted to the second retracted position as flow advances from FIG. 9 to FIG. 10, and the angular restraining part (29a) of the lock plate (29) is meshed with the outer angular part (26b) of the coupling (26) to break the coupling (26).

As a result, the spiral shaft (21) and the withdraw-in and withdraw-out shaft (22) are temporarily stopped to notify the user which position (connected, test and disconnected position) the breaker body has reached.

Now, referring to FIG. 10, when the user ceases to rotate the handle, the coupling (26) is retracted by elasticity of the elongating upper spring (28) to allow the apparatus to return to the initial state as illustrated in FIGS. 5 and 11. Accordingly, the reset operator (24) is hitched at the front tip end (24b) thereof by the support member (25) to get restrained of linear downward movement.

Figure 13:
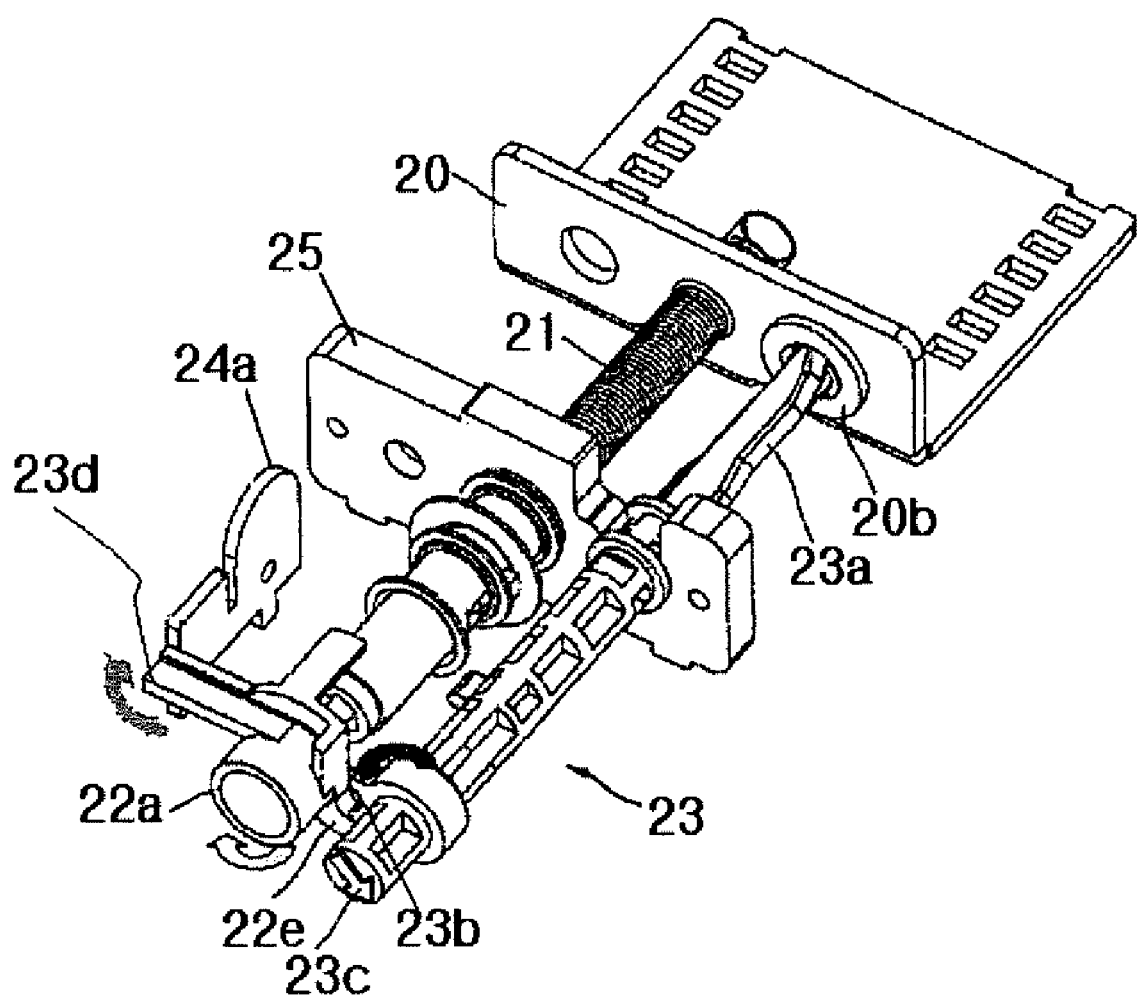
FIG. 13 is an operating state view illustrating an apparatus according to an exemplary implementation of FIG. 12.

Now, referring to FIG. 13, the reset push tip end (24a) which has received the clockwise rotational force from the latch part (23b) is rotated clockwise to rotate the whole reset operator (24) clockwise, where the restraint of the reset push tip end (24a) is released by the rotation of the an untangle prevention bar (23d) of the reset operator (24) or the reset operator (24).

In other words, FIG. 13 shows a state of the reset operator (24) just before the release of the operation. Now, the counter-clockwise rotation of the indicating rod (23) illustrated in FIG. 13 will be further elaborated. The support protruder of the moving rack (20) is moved along the twist groove part of the twist part (23a) at the indicating rod (23) by the downward movement of the moving rack (20) to rotate the indicating rod (23) counter-clockwise, and the latch part (23b) of the indicating rod (23) proceeds to a position of the latch groove part (24c) of the reset operator (24) side being hit when the moving rack (20) assumes the connected position where the withdraw-in is completed by the handle and the withdraw-in and withdraw-out shaft (22), thereby lifting the untangle prevention bar (23d) upward.

The coupling (26) is retracted by this mechanism to cause the circular periphery part (26a) of the coupling (26) to be located in within the angular restraining part (29a) of the lock plate (29) in a free rotating lock-released state. The inner angular peripheral part (26b-1) at the coupling (26) is meshed only with the rectangular part (22c) of the withdraw-in and withdraw-out shaft (22), and the rectangular part (21b) of the spiral shaft (21) idles due to the lock-released state even if the handle is connected to the withdraw-in and withdraw-out shaft (22) for rotation. As a result, constituent elements of the apparatus can be protected against damage caused by excessive irrational rotation.

As apparent from the foregoing, there is an advantage in the withdraw-in and withdraw-out apparatus for an air circuit breaker thus described according to the present disclosure in that a reset operator is released whenever connected, test or disconnected position is assumed, whereby a coupling is moved to a drive non-connection position to disconnect a driving connection between a withdraw-in and withdraw-out shaft and a spiral shaft, such that even if a user forcibly and continuously rotates a handle, a power is not transmitted to thereby prevent the constituent elements from being damaged. While the invention has been described with reference to exemplary implementations, it will be understood by those skilled in the art that various changes may be made and equivalents may be substituted for elements thereof without departing from the scope of the present novel concept. In addition, many modifications may be made to adapt a particular situation or material to the teachings of the disclosure without departing from the essential scope thereof. Therefore, it is intended that the present disclosure not be limited to the particular implementations disclosed as the best or only mode contemplated for carrying out this concept, but that the concept will include all implementations falling within the scope of the appended claims.

What is claimed is:

1. A withdraw in and withdraw out apparatus for an air circuit breaker for withdrawing in and withdrawing out a breaker body from a cradle thereof comprising a coupling device movable to a position from which a withdraw-in and withdraw-out driving force (hereinafter referred to as driving force) generated by a manipulating handle can be transmitted to the apparatus and a position from which the driving force can be discontinued from being transmitted to the apparatus.

2. The apparatus as claimed in claim 1, wherein the coupling device comprises: a coupling capable of being moved to a position where the driving force is connected to the apparatus and to a position where the connection is discontinued to idle the apparatus, and a spring for resiliently supporting the coupling in such a manner that the spring resiliently supports at an elastic energy-accumulated position the coupling for transmitting the driving force to the apparatus, and the spring resiliently supports at an elastic energy-released position the coupling for discontinuing the driving force to the apparatus.

3. A withdraw in and withdraw out apparatus for an air circuit breaker for withdrawing in and withdrawing out a breaker body from a cradle thereof comprising: a withdraw-in and withdraw-out shaft formed with a handle connector connecting a manipulating handle for obtaining a rotation driving force and providing the rotation driving force transmitted from the handle connector as a driving force for withdrawing in and withdrawing out the body thereof; a spiral shaft rotatable by the rotation driving force from the withdraw-in and withdraw-out shaft and formed with a spiral part for converting the rotation driving force to a linear moving force; a moving rack formed with a spiral support spirally connected to the spiral part of the spiral shaft and for linearly moving along with the spiral part of the spiral shaft to linearly move the body loaded thereon to withdraw-out and withdraw-in directions; a coupling interposed between the withdraw-in and withdraw-out shaft and the spiral shaft and capable of being moved to a position where the rotation driving force from the withdraw-in and withdraw-out shaft is connected to the spiral shaft and to a position where the connection is discontinued to idle the withdraw-in and withdraw-out shaft; a spring for resiliently supporting the coupling in such a manner that the spring resiliently supports at an elastic energy-accumulated position the coupling for transmitting the rotation driving force from the withdraw-in and withdraw-out shaft to the spiral shaft, and the spring resiliently supports at an elastic energy-released position the coupling for discontinuing the rotation driving force to the spiral shaft; a reset operator including a reset push tip end receiving a push from a user when pressed by the user in such a manner that the spring is pressed to a position where the elastic energy is accumulated to allow the coupling to stay on a position where the rotation driving force from the withdraw-in and withdraw-out shaft is transmitted to the spiral shaft, and a spring support connecting an end of the spring; an indicating rod formed with a latch restraining the reset operator or releasing the restraint of the reset operator whenever the body is located at a connected position, a test position and a disconnected position, and a twist part connected to the moving rack to thereby indicate a position of the body by rotating in response to the movement of the moving rack; and a lock plate temporarily stopping the withdraw-in and withdraw-out operation of the body by temporarily breaking the coupling whenever the indicating rod releases the reset operator from the connected, test and disconnected positions.

4. The apparatus as claimed in claim 3, wherein the coupling comprises, an inner angular peripheral surface part drivingly connecting the withdraw-in and withdraw-out shaft to a driving connecting tip of the spiral shaft; and an inner circular peripheral surface part capable of idling the withdraw-in and withdraw-out shaft by stopping discontinuing the driving connection between the withdraw-in and withdraw-out shaft to a driving connecting tip of the spiral shaft.

5. The apparatus as claimed in 4, wherein the withdraw-in and withdraw-out shaft and the driving connecting tip of the spiral shaft are formed in angular shapes to mesh with the angular inner peripheral surface of the coupling and rotate therewith.

6. The apparatus as claimed in claim 3, wherein the coupling comprises: a key groove part capable of drivingly connecting the withdraw-in and withdraw-out shaft to the driving connecting tip end of the spiral shaft; and an inner circular peripheral surface capable of idling the withdraw-in and withdraw-out shaft by stopping the driving connection between the withdraw-in and withdraw-out shaft and the driving connecting tip of the spiral shaft.

7. The apparatus as claimed in claim 6, wherein the withdraw-in and withdraw-out shaft and the driving connecting tip of the spiral shaft are formed with a resiliently supported key part capable of being rotated by being meshed with the key groove part of the coupling.

8. The apparatus as claimed in claim 3, wherein the apparatus further comprises a support member rotatably supporting the spiral shaft and the indicating rod and linearly supporting the reset operator.

9. The apparatus as claimed in claim 3, wherein the coupling comprises: an outer angular peripheral surface and an outer circular peripheral surface; and an inner angular peripheral surface restraining the outer angular peripheral surface thereof to correspond with the lock plate so that the coupling can be temporarily stopped in rotation.

10. The apparatus as claimed in claim 3, wherein the indicating rod assumes three different situations divided into a disconnected position where the body is disconnected from the cradle, a test position where the body can assume an electrical test with the cradle, and a connected position where the body is connected to the cradle.

11. The apparatus as claimed in claim 3, wherein the coupling is protrudingly formed at one side thereof with a latch groove, and the indicating rod is circumferentially formed with a restraining rail of a predetermined length into which the latch groove can selectively be inserted and coupled.

* * * * *